(12) United States Patent
Forloni

(10) Patent No.: US 8,129,007 B2
(45) Date of Patent: Mar. 6, 2012

(54) COEXTRUDED HEAT-SHRINKABLE POLYESTER FILM

(75) Inventor: Roberto Forloni, Rho (IT)

(73) Assignee: Cryovac, Inc., Duncan, SC (US)

( * ) Notice: Subject to any disclaimer, the term of this patent is extended or adjusted under 35 U.S.C. 154(b) by 759 days.

(21) Appl. No.: 12/223,644

(22) PCT Filed: Jan. 29, 2007

(86) PCT No.: PCT/EP2007/050853
§ 371 (c)(1),
(2), (4) Date: Aug. 5, 2008

(87) PCT Pub. No.: WO2007/093495
PCT Pub. Date: Aug. 23, 2007

(65) Prior Publication Data
US 2009/0017245 A1    Jan. 15, 2009

(30) Foreign Application Priority Data
Feb. 16, 2006 (EP) .................. 06110040

(51) Int. Cl.
*B65B 53/02* (2006.01)
*B32B 27/06* (2006.01)
*B29C 47/06* (2006.01)

(52) U.S. Cl. ....... 428/34.9; 428/480; 428/483; 428/346; 428/43; 156/244.11

(58) Field of Classification Search ............... 428/475.2, 428/35.7, 480, 483, 474.4, 364, 34.9
See application file for complete search history.

(56) References Cited

U.S. PATENT DOCUMENTS

| 5,747,174 A | 5/1998 | Kimura et al. |
| 5,922,164 A * | 7/1999 | Kimura et al. ............. 156/308.2 |
| 6,447,925 B1 * | 9/2002 | Tabota et al. ................. 428/480 |
| 6,905,774 B2 * | 6/2005 | Takahashi et al. ............ 428/458 |
| 2005/0100750 A1 | 5/2005 | Peiffer et al. |
| 2005/0106342 A1 | 5/2005 | Dawes et al. |

* cited by examiner

*Primary Examiner* — Rena Dye
*Assistant Examiner* — Yan Lan
(74) *Attorney, Agent, or Firm* — Ashley D. Wilson

(57) ABSTRACT

Coextruded, biaxially oriented, heat-shrinkable films having a base layer comprising a polyester having an intrinsic viscosity greater than 0.75 and at least one outer heat-sealable layer directly adhered to the base layer are disclosed. The outer layer is heat-sealable and optionally peelable in particular to polyester containers. The invention further relates to a process for producing the film and to packages comprising a container, a product and the coextruded, biaxially-oriented heat-shrinkable film sealed onto the container. The packages are suitable for use with ready-prepared foods, so-called "ready-meals", which are intended to be warmed in a microwave or in a conventional oven.

13 Claims, No Drawings

COEXTRUDED HEAT-SHRINKABLE POLYESTER FILM

This application is the National Stage (35 U.S.C. §371) of International Application No. PCT/EP2007/050853 filed Jan. 29, 2007, which claims the benefit of European Patent Application No. 06110040.0, filed Feb. 16, 2006.

TECHNICAL FIELD

The invention relates to a coextruded, biaxially oriented, heat-shrinkable polyester film having a base layer and at least one outer heat-sealable layer directly adhered to the base layer. The base layer comprises a polyester having an intrinsic viscosity greater than 0.75. The outer layer is heat-sealable and optionally peelable in particular to polyester containers. The heat-sealable and optionally peelable outer layer comprises a polyester resin. The invention further relates to a process for producing the film and to its use as a lidding film in food packaging operations.

DISCLOSURE OF THE INVENTION

Biaxially oriented polyester films are commonly used as lidding films, in particular for ovenable containers. Packaging systems comprising a rigid heat stable container having a thin flexible thermoplastic film sealed onto it are commonly used for the packaging of so-called "ready-meals", that is food products which only require heating to be ready for consumption. Heating can be carried out either in a microwave or in a conventional oven. Due to the temperatures involved in the heating step only few materials can be used. Materials suitable for the container are for instance aluminium, polyester-coated cardboard or poly(ethylene terephthalate) (PET). Crystalline PET (CPET) containers are especially suitable for this application. To improve the heat-sealability of these containers with the lidding films often the container comprises a layer of amorphous PET (APET) as the food contact layer. Biaxially oriented PET is generally employed as the lidding film due to its high stability at standard heating temperatures. To improve the heat-sealability of the lidding film to the container often the lidding film also comprises a heat-sealable layer of lower melting or amorphous polyester. The heat-sealable layer is often solvent- or extrusion-coated over the base layer, as described in EP-A-1,362,075 and WO 96/19333. Usually, the biaxially oriented polyester films of the prior art are heat-set, i.e. non-heat-shrinkable. In the packages obtained with non-heat-shrinkable films the flexible lid remains floppy on the product. This relaxed appearance is generally not well perceived by the majority of consumers and in fact most producers enclose the lidded container in a printed carton sleeve, adding to the final cost of the package. Thus, the use of a heat-shrinkable film would be advantageous. Even more advantageous would be the use of a heat-shrinkable film that does not need a separate heat-treatment to promote shrink, that is a film provided with such heat-shrinking properties that the heat released during the step of heat-sealing the film to the container is sufficient to promote shrink and give a taut package. The amount of shrink of the heat-shrinkable film and its shrink tension at the heat-sealing temperatures should in any case be such that the resulting package is not distorted. The need for controlled shrink properties, i.e. shrink and/or shrink tension, is particularly important in the case of films used in the packaging of products which are heat-treated in the package, for instance pasteurized, to avoid distortion or breakage of the package as a consequence of the heat-treatment.

Among the biaxially oriented heat-shrinkable polyester films known in the art EP-A-1,529,797 discloses a film comprising a base layer of a thermoplastic polyester and a heat-sealable outer layer also comprising a polyester, said film having a shrink measured at a circulated air temperature of 100° C. over a period of 15 minutes of more than 5% in at least one direction. The shrinkage promotes self-venting during heating of the food product in the package. No indication is given of the shrinking behaviour of these films at shorter heating times or at higher temperatures.

EP-B-1,090,739 discloses a mono-layer polyester biaxially oriented heat-shrinkable film which shrinks, when treated at 95° C. for 10 seconds, from 30 to 50% in at least one direction and from 25 to 45% in the perpendicular direction.

U.S. Pat. No. 5,747,174 discloses biaxially oriented films comprising a base layer of a polyester resin with a glass transition temperature not higher than 50° C. and two outer layers, also comprising a polyester resin, for a variety of applications. Among the films disclosed in U.S. Pat. No. 5,747,174 there are heat-shrinkable films for packaging applications, which are described as having a shrink at 100° C. of at least 25% in each direction.

Films as the ones described in EP-B-1,090,739 and U.S. Pat. No. 5,747,174 would be unsuitable in tray lidding applications: the high shrink at temperatures well below the heat-sealing temperature of polyester films (typically from 140 to 200° C.) would likely cause an excessive shrink of the film before sealing is complete, thus requiring a great excess of film in order to successfully form a seal between the film and the rim of the tray.

It has now been found that a solution to the above problem is provided by a biaxially oriented polyester film having a base layer (i.e. the layer which in terms of thickness represents the highest portion of the film) comprising a polyester resin having an intrinsic viscosity greater than 0.75. When the base layer of the film comprises a polyester resin with an intrinsic viscosity greater than 0.75 it is possible to carry out the biaxial orientation process at lower temperatures and at higher orientation ratios than those typically used for polyester resins with an intrinsic viscosity lower than 0.75. Transversal orientation temperatures not exceeding 130° C., typically lower than 120° C. can be used. This has the effect that the resulting heat-shrinkable polyester film has no or negligible shrink at temperatures below the polyester heat-sealing temperatures (typically from 140 to 200° C.) and a maximum shrink of 30% in each direction over the same temperature range.

A first object of the present invention is therefore a coextruded, biaxially oriented heat-shrinkable film comprising a base layer comprising a polyester having an intrinsic viscosity greater than 0.75 and a first outer heat-sealable layer directly adhered to said base layer, said heat-sealable layer comprising an amorphous polyester or a crystalline polyester having a melting temperature not higher than the melting temperature of the polyester of the base layer.

A second object of the present invention is a method for the manufacture of a coextruded, biaxially oriented, heat-shrinkable film comprising a base layer comprising a polyester having an intrinsic viscosity greater than 0.75 and a first outer heat-sealable layer directly adhered to said base layer, said heat-sealable layer comprising an amorphous polyester or a crystalline polyester having a melting temperature not higher than the melting temperature of the polyester of the base layer.

A third object of the present invention is a package comprising a container, a product and a lid formed of the coextruded, biaxially oriented, heat-shrinkable film of the first object sealed onto said container.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols.

The intrinsic viscosity (IV) is defined as the limiting value of the reduced viscosity at infinite dilution of the polymer and is determined using a capillary viscosimeter. Suitable methods for the determination of the intrinsic viscosity are for instance ASTM method D4603-03 and Voridian's internal method VGAS-A-AN-G-V-1.

In a first embodiment, the film of the present invention consists of a base layer comprising a polyester having an IV greater than 0.75 and one outer heat-sealable layer directly adhered to said base layer. In this case, the film has a two-layer structure.

The base layer of the film comprises a polyester having an IV greater than 0.75, e.g. 0.76, 0.77, 0.78, 0.79. Preferably, the base layer of the film comprises a polyester having an IV of at least 0.80.

The polyester resin used as the starting material may also have an intrinsic viscosity lower than 0.75 provided the intrinsic viscosity in the film before orientation is greater than this value. As an example the intrinsic viscosity of the polyester resin could be increased during the extrusion process by means of suitable additives, like so-called "chain extenders". Suitable chain-extenders are for instance those described in EP-A-372,846.

Suitable polyester resins are, for instance, polyesters of ethylene glycol and terephthalic acid, i.e. poly(ethylene terephthalate) (PET). Preference is given to polyesters which contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$)alkanedioic acids are particularly suitable, in particular succinic acid, sebacic acid, adipic acid, azelaic acid, suberic acid or pimelic acid.

Suitable other aliphatic diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Mixtures or blends of homo- and/or co-polyesters can be used for the base layer provided the polyester having an IV greater than 0.75 represents the major proportion of the base layer. Preferably the base layer comprises at least 50%, 60%, 70%, 80%, 85%, 90%, 95% by weight of a polyester having an IV greater than 0.75, based on the total weight of the base layer. Preferably the base layer comprises at least 50%, 60%, 70%, 80%, 85%, 90%, 95% by weight of a PET having an IV of at least 0.80. An example of such a polymer is PET 9921W® sold by Voridian, which has a melting point $T_m$ of 245° C. and an IV of 0.80.

Any homo- and/or co-polyester can be blended with the polyester resin having an IV greater than 0.75.

For instance the base layer may comprise at least 50%, 60%, 70%, 80%, 85%, 90%, 95% of the polyester resin having an IV greater than 0.75 and not more than 50%, 40%, 30%, 20%, 15%, 10%, 5% of an amorphous polyester resin. The amorphous polyester used in the base layer may be the same or a different amorphous polyester than the one used in the heat-sealable layer.

Suitable amorphous polyester resins for use in the base layer are co-polyesters of terephthalic acid with an aliphatic diol and a cycloaliphatic diol, especially ethylene glycol and 1,4-cyclohexanedimethanol, like PETG Eastar® 6763 sold by Eastman.

Suitable base layers comprise at least 50%, 60%, 70%, 80%, 85%, 90%, 95% of the polyester resin having an IV greater than 0.75 and not more than 50%, 40%, 30%, 20%, 15%, 10%, 5% of an amorphous polyester of terephthalic acid with ethylene glycol and 1,4-cyclohexanedimethanol.

The total thickness of the inventive polyester film may vary within wide limits. It is preferably from 3 to 100 µm, in particular from 5 to 80 µm, preferably from 10 to 70 µm, even more preferably from 15 to 50 µm. The thickness of the base layer represents at least 50% of the overall thickness of the multi-layer film of the invention, from 50 to 85% of the overall thickness being preferred.

The heat-sealable layer comprises an amorphous polyester resin or a crystalline polyester resin having a melting temperature not higher than the melting temperature of the polyester of the base layer. The term "crystalline" being used herein to indicate that the resin has a definite melting temperature.

The heat-sealable layer may comprise an amorphous co-polyester resin or a crystalline co-polyester resin having a melting temperature lower than the melting temperature of the polyester of the base layer.

Co-polyester resins derived from one or more dicarboxylic acid(s) or their lower alkyl (up to 14 carbon atoms) diesters with one or more glycol(s), particularly an aliphatic or cycloaliphatic glycol are suitable as the polyester resins for the heat-sealable layer. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol.

In one embodiment, the crystalline co-polyester of the heat-sealable layer comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. The concentration of the aromatic dicarboxylic acid present in the copolyester is preferably in the range from 45 to 80, more preferably 50 to 70, and particularly 55 to 65 mole % based on the dicarboxylic acid components of the co-polyester. The concentration of the aliphatic dicarboxylic acid present in the copolyester is preferably in the range from 20 to 55, more preferably 30 to 50, and particularly 35 to 45 mole % based on the dicarboxylic acid components of the copolyester. Particularly preferred examples of such copolyesters are (i) copolyesters of azeleic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acid/butylene glycol having a melting point $T_m$ of 117° C., and a copolyester of azeleic acid/terephthalic acid/ethylene glycol having a $T_m$ of 150° C.

In an alternative embodiment, the co-polyester of the heat-sealable layer is derived from an aliphatic diol and a plurality of aromatic dicarboxylic acids, particularly terephthalic acid and isophthalic acid. A preferred co-polyester is derived from ethylene glycol, terephthalic acid and isophthalic acid. The preferred molar ratios of the terephthalic acid component to the isophthalic acid component are in the range of from 50:50 to 90:10, preferably in the range from 65:35 to 85:15.

In an alternative embodiment, the heat-sealable layer comprises an amorphous co-polyester. Suitable amorphous co-polyesters are those derived from an aliphatic diol and a cycloaliphatic diol with one or more, dicarboxylic acid(s), preferably an aromatic dicarboxylic acid. Typical polyesters which provide satisfactory heat-sealable properties include co-polyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. An example of such a polymer is PETG Eastar®6763 sold by Eastman, which comprises a copolyester of terephthalic acid, about 33 mole % 1,4-cyclohexane dimethanol and about 67 mole % ethylene glycol and which has a glass transition temperature $T_g$ of 81° C.

The thickness of the heat-sealable layer is generally between about 5 and 40% of the thickness of the base layer. The heat-sealable layer may have a thickness of up to about 25 μm, preferably up to about 15 μm, more preferably between about 0.5 and 10 μm, and more preferably between about 0.5 and 7 μm.

The film of the present invention forms strong seals with polyester-based materials, in particular with both APET and CPET containers.

To reduce the sealing strength, thereby facilitating the removal by hand of the film from the container, it has been found convenient to blend the polyester resin of the heat-sealable outer layer with 3 to 40% by weight, 5 to 30% by weight, preferably 15 to 25% by weight of an appropriate thermoplastic resin. Suitable thermoplastic resins that contribute to lowering the sealing strength without impairing the optical properties of the film are polyamides, polystyrenes, in particular styrene-butadiene block copolymers, ionomers, ethylene/unsaturated carboxylic acid copolymers, like ethylene/(meth)acrylic acid copolymers, ethylene/unsaturated esters copolymers, like ethylene/vinyl acetate copolymers, ethylene/propylene copolymers and ethylene/cyclic olefin copolymers, like ethylene/norbornene copolymers.

It has been found that a good balance between hermeticity of the seal between film and container and ease of removal of the film on opening the package can be obtained by blending an amorphous co-polyester with 3 to 40% by weight of an ethylene/acrylic acid copolymer or of an ethylene/propylene copolymer. Good results have also been obtained by blending PET with with 3 to 40% by weight of a polyamide. Suitable polyamides are for instance polyamide 6, polyamide 66, and copolyamides including copolyamide 6/9, copolyamide 6/10, copolyamide 6/12, copolyamide 6/66, copolyamide 6/69, and aromatic polyamides and copolyamides, such as 6I, 6I/6T, MXD6, MXD6/MXDI.

Blends of an amorphous co-polyester with 3 to 40% by weight of an ethylene/acrylic acid copolymer are particularly suitable in packaging applications which require heat-treatment, like pasteurization, as they provide the best balance between ease of opening and hermeticity of the package. An example of a suitable amorphous polyester is PETG Eastar® 6763 sold by Eastman.

In a second embodiment, the film of the present invention has a three-layer structure: a base layer comprising a polyester having an intrinsic viscosity greater than 0.75, a first outer heat-sealable layer and a second outer layer on the opposite side of the base layer to the outer heat-sealable layer.

The second outer layer may comprise any suitable thermoplastic resin, although a polyester resin is preferred. The polyester resin may be the same as the resin of the base layer or different.

For instance the three-layer film may comprise the base layer, a first outer heat-sealable layer and a second outer layer comprising a polyester resin different from the resin used both in the base layer and in the heat-sealable layer. Alternatively, the three-layer film may comprise the base layer and two outer heat-sealable layers comprising the same amorphous polyester or the same crystalline polyester having a melting temperature not higher than the melting temperature of the polyester of the base layer. Alternatively, the three-layer film may comprise the base layer, a first outer heat-sealable layer and a second outer layer comprising the same polyester resin as the base layer.

In a particularly convenient configuration the three-layer film of the invention comprises a base layer comprising a polyester having an intrinsic viscosity greater than 0.75, a first outer heat-sealable layer comprising an amorphous polyester and a second outer layer comprising the same polyester resin as the base layer.

Preferably the three-layer film comprises a base layer comprising at least 50%, 60%, 70%, 80%, 85%, 90%, 95% of the polyester resin having an IV greater than 0.75 and not more than 50%, 40%, 30%, 20%, 15%, 10%, 5% of an amorphous polyester, a first outer heat-sealable layer comprising an amorphous polyester and a second outer layer comprising the same polyester resin as the base layer. Preferably the amorphous polyester in the base layer is the same as the amorphous polyester in the heat-sealable layer.

The thickness of second outer layer is generally between about 5 and 40% of the thickness of the base layer. The second outer layer may have a thickness of up to about 25 μm, preferably up to about 15 μm, more preferably between about 0.5 and 10 μm, and more preferably between about 0.5 and 7 μm. The thickness of the two outer layers may be the same or different.

Typically the films of the present invention have no or negligible shrink at temperatures below 140° C. The shrink (in each direction) is generally less than 5% at temperatures below 100° C., below 120° C., even below 140° C. The shrink (in each direction) is at least 5% at 150° C. Usually the shrink (in each direction) does not exceed 30% over the common heat-sealing temperatures of polyester films, namely in the range of from 140 to 200° C. The shrink generally does not exceed 30% (in each direction) at 180° C., at 160° C., and even at 150° C.

The maximum value of the shrink tension of the films of the invention is typically not less than 15 kg/cm² in each direction, generally greater than 20 kg/cm² in each direction.

However when the films of the invention are used in applications that require heat-treatment of the product inside the package, like pasteurization, lower values of shrink tension may be advantageous as they may reduce the distortion of the package. Films suitable for this type of applications have maximum values of the shrink tension starting from 5, 8 or even 10 kg/cm² in at least one direction.

The maximum value of the shrink tension of the films does not exceed 70 kg/cm² in each direction, preferably it is less than 50 kg/cm², 40 kg/cm² in each direction.

Usually the films of the invention have the following combination of shrink/shrink tension properties in each direction: a shrink of less than 5% at 100° C. and of at least 5% at 150° C. and a shrink tension not exceeding 70 kg/cm². Preferably the films of the invention have a shrink in each direction of less than 5% at 100° C. and of at least 5% but not more than 30% at 150° C. and a shrink tension not exceeding 70 kg/cm² in each direction. Even more preferably the films of the invention have a shrink in each direction of less than 5% at 100° C. and of at least 5% but not more than 30% at 150° C. and a shrink tension not exceeding 50 kg/cm² in each direction.

One or more of the layers of the film of the present invention may contain any of the additives conventionally employed in the manufacture of polymeric films. Thus, agents such as pigments, lubricants, anti-oxidants, radical scavengers, UV absorbers, thermal stabilisers, anti-blocking agents, surface active agents, slip aids, optical brighteners, gloss improvers, viscosity modifiers may be incorporated as appropriate.

In particular, to improve the processing of the film in high speed packaging equipment slip and/or anti-blocking agents may be added to one or both of the outer layers. The additives may be added in the form of a concentrate in a polyester carrier resin. The amount of additive is typically in the order of 0.2 to 5% by weight of the total weight of the layer.

The film of the present invention preferably comprises at least one surface provided with anti-fogging properties. Typically, the anti-fogging surface is the surface of the heat-sealable layer, that is the surface directly facing the product in the container.

To obtain an anti-fogging surface anti-fogging agents may be compounded directly into the polyester resin of the heat-sealable layer before extrusion of the film of the invention. Suitable anti-fogging agents are for instance non-ionic fluorinated surfactants, like alkylester fluorides, perfluoroalkyl ethyleneoxides, anionic fluorinated surfactants, like quaternary ammonium salt of perfluoroalkyl sulfonates, non-ionic surfactants, like polyhydric alcohol fatty acid esters, higher fatty acid amines, higher fatty acid amides, and ethylene oxide adducts of higher fatty acid amines or amides and the like. The amount of anti-fogging agent added to the heat-sealable layer is generally from 0.5 to 8%, from 1 to 5%, from 1 to 3% by weight of the heat-sealable layer.

Alternatively, the anti-fogging agent may be in the form of a coating applied onto the heat-sealable outer layer. Conventional techniques can be used for the application of the anti-fogging agent to the heat-sealable layer, like gravure coating, reverse kiss coating, fountain bar coating, spraying.

The application of the anti-fogging agent may be carried out either by an in-line method involving application during the manufacture of the heat-shrinkable polyester film or by an off-line coating method involving application after the manufacture of the heat-shrinkable polyester film.

Suitable anti-fogging agents for this application are non-ionic surfactants like polyhydric alcohol fatty acid esters, higher fatty acid amines, higher fatty acid amides, polyoxyethylene ethers of higher fatty alcohols, and ethylene oxide adducts of higher fatty acid amines or amides. Among these, preferred are polyhydric alcohol fatty acid esters, polyoxyethylene ethers of higher fatty alcohols and glycerin fatty acid esters.

The amount of the anti-fogging agent coating is not particularly limited, but it may be 0.1 to 8 mL/m², 0.5 to 7 mL/m², 0.5 to 5 mL/m².

A second object of the present invention is a method for the manufacture of a coextruded, biaxially oriented, heat-shrinkable film comprising the steps of coextruding a base layer comprising a polyester resin having an IV greater than 0.75 directly adhered to at least one outer heat-sealable layer comprising an amorphous polyester or a crystalline polyester having a melting temperature not higher than the melting temperature of the polyester of the base layer, quenching the extrudate and biaxially orienting said extrudate at a temperature not exceeding 130° C.

The method may be carried out by any process known in the art for producing a biaxially oriented film, for example a tubular or a flat film orientation process.

In a tubular process, also known as "double bubble" process, simultaneous biaxial orientation is obtained by extruding a thermoplastic resin tube which is subsequently quenched, reheated and then expanded by internal gas pressure to induce transverse orientation, and wound at a rate which will induce longitudinal orientation. An example of an equipment suitable for this technique is disclosed by U.S. Pat. No. 4,841,605.

In a flat film process, the film-forming thermoplastic resins are extruded through a T-die and rapidly quenched upon a chill roll to ensure that the resins are quenched to the amorphous state. Orientation is then effected by stretching, simultaneously or sequentially, the quenched extrudate at a temperature above the glass transition temperature of the thermoplastic resin.

In the sequential flat orientation method a flat, quenched extrudate is firstly oriented in one direction, usually the longitudinal direction, i.e. the forward direction through the film stretching machine, and then in the transverse direction. Longitudinal stretching of the extrudate is conveniently carried out over a set of rotating rolls (MDO), which rotate at different speeds. At least one of the first pairs of rolls is heated, for example by inner circulation of hot oil. Transverse stretching is usually carried out in a tenter apparatus (TDO), which comprises a certain number of heating zones and suitable stretching means. In the subsequent annealing step the biaxially oriented film is dimensionally stabilised by heat-treatment at a temperature below the melting temperature of the film.

To produce the heat-shrinkable film of the invention the polymers for the base layer, for the heat-sealable outer layer and, where appropriate, for the second outer layer are fed to separate extruders. The melts are extruded through a multi-layer T-die and quenched over a chill roll. Longitudinal stretching (MDO) of the extrudate is conveniently carried out at a temperature range from 60 to 120° C., preferably 70 to 100° C.

In the transverse stretching (TDO), the temperatures of the film are in the range from 90° C. (preheating zone) to 130° C. (stretching zone), preferably 90° C. (preheating zone) to 110° C. (stretching zone).

The longitudinal stretching ratio is in the range from 2.0:1 to 5.0:1, preferably from 2.3:1 to 4.8:1. The transverse stretching ratio is generally in the range from 2.4:1 to 6.0:1, preferably from 2.6:1 to 5.5:1.

Annealing is carried out at a temperature of from 150 to 210° C., preferably from 160 to 200° C., even more preferably from 160 to 195° C. The annealing temperature can be used to fine tune the final shrink properties of the film. Subsequently, the film is wound up in a customary manner.

The invention further provides a package comprising a container, a product placed in the container and a lid formed from the coextruded biaxially oriented heat-shrinkable polyester film of the invention sealed onto the container.

Typically the surface of the container in contact with the product, i.e. the surface involved in the formation of the seal with the lidding film, comprises a polyester resin. For instance the container can be made of a cardboard coated with polyester or it can be integrally made of a polyester resin. Examples of suitable containers for the package of the invention are CPET, APET or APET/CPET containers. Such containers can be either foamed or not-foamed, i.e. solid.

The package is produced by techniques well-known to those skilled in the art. Once the food to be packaged has been introduced into the container, the heat-shrinkable film of the invention is sealed onto the container by means of temperature and/or pressure using conventional techniques and equipment. The film is placed on the container such that the heat-sealable layer is in contact with the surface of the container and the base layer, or optionally the second outer layer, is the outermost surface of the film. Sealing is carried out by means of a heated frame at temperatures of from 140 to 200° C., 150 to 190° C. at a pressure of 2 to 10 bar, 4 to 8 bar. Sealing times are typically in the order of 0.3 to 2.0 seconds, 0.5 to 1.0 seconds. The heat generated by the sealing frame, regardless of the short sealing times, promotes the shrinkage of the film in both directions without distortion of the container to give a taut hermetically sealed lid.

The package is particularly suitable for use with ready-prepared foods, so-called "ready-meals", which are intended to be warmed in a microwave oven or in any other type of oven, such as a conventional convection oven, a direct radiation oven and a forced hot air oven. These types of food products generally undergo a heat-treatment, like pasteurization, to increase their shelf-life. Due to the controlled shrink properties of the films of the present invention the products can be pasteurized directly in the package without any distortion of the container even after the prolonged heat-treatment.

The present invention will be illustrated by some examples, however the present invention is not limited to these examples. The coextruded, biaxially oriented, heat-shrinkable polyester films prepared in the following Examples and Comparative Examples were evaluated by the methods described below.

% SHRINK: i.e. the percent dimensional change in a 10 cm×10 cm specimen of film when subjected to a selected heat, has been measured by the ASTM Standard Test Method D 2732-83, immersing the specimen for 5 seconds in a heated oil bath.

SHRINK TENSION: i.e. the force per original unit width developed by a film in the longitudinal (LD) or transversal (TD) direction at a specified temperature in its attempt to shrink while under restraint, has been measured by the following internal test method: a 25.4 mm wide strip of film is cut from the sample in the longitudinal or transverse direction. The force measurement is made by a load cell on which a clamping jaw is connected. Opposed to this jaw, a second one on which the specimen is fixed, can be adjusted in position by an external hand knob to pretension the specimen. The two jaws keep the specimen in the center of a channel into which an impeller blows heated air. In the air channels three thermocouples are fixed to measure the temperature. The temperature of the specimen, as measured by the thermocouples, is increased at a rate of about 2° C./second up to about 180° C. and the force is measured continuously. The measured force is then divided by the specimen original width to obtain the shrink force and further divided by the thickness of the film sample to give the shrink tension. Typically the shrink tension is expressed in $kg/cm^2$.

The polymers used in the following Examples and Comparative Examples are reported in Table 1:

TABLE 1

| PET1 | Poly(ethylene terephthalate), IV = 0.80 |
| PET2 | Poly(ethylene terephthalate), IV = 0.60 |
| PETG1 | Co-polyester of terephthalic acid, 1,4-cyclohexane dimethanol and ethylene glycol, $T_g$ = 81° C. |
| PETG2 | Co-polyester of terephthalic acid, 1,4-cyclohexane dimethanol and ethylene glycol, $T_g$ = 82° C. with 6 wt. % $SiO_2$ and 10 wt. % waxes |

EXAMPLE 1

A two-layer, heat-shrinkable film consisting of a base layer of PET1 and an outer heat-sealable layer of PETG1 with a total thickness of 25 μm and a thickness ratio of 4:1 was produced by the sequential flat orientation process described above. In particular, the temperature of the chill roll was kept at about 21° C. The unstretched sheet was preheated at about 82° C. and then stretched between rolls in the machine direction at 91° C. at a ratio of 3.4:1. The longitudinally stretched sheet was pre-heated at about 95° C. and then stretched in the transverse direction at about 100° C. at a ratio of 5.0:1. The annealing step was carried out at a temperature of from 200 to 205° C.

COMPARATIVE EXAMPLE 1

A two-layer, heat-shrinkable film consisting of a base layer of PET2 and an outer heat-sealable layer of PETG1 with a total thickness of 25 μm and a thickness ratio of 4:1 was produced as described in Example 1. The following temperature/stretching adjustments, in particular to the transversal stretching conditions, were required in order to successfully produce an oriented film: the sheet was preheated at about 82° C. and then stretched between rolls in the machine direction at 91° C. at a ratio of 3.2:1. The longitudinally stretched sheet was pre-heated at about 125° C. and then stretched in the transverse direction at about 120° C. at a ratio of 3.8:1. The annealing step was carried out at a temperature of from 200 to 205° C. Thus, compared to the film with PET1 to obtain films with PET2 it was necessary to increase the orientation temperature (from 95/100° C. to 125/120° C.) and reduce the transversal stretching ratio (from 5:1 to 3.8:1).

The shrink properties of the films of Example 1 and Comparative Example 1 are reported in Table 2.

TABLE 2

|  |  | Example 1 | Comp. Example 1 |
|---|---|---|---|
| Shrink (%) at 120° C. | L | 3 | 1 |
|  | T | 4 | 0 |
| Shrink (%) at 140° C. | L | 6 | 2 |
|  | T | 8 | 1 |
| Shrink (%) at 160° C. | L | 11 | 6 |
|  | T | 14 | 3 |

TABLE 2-continued

|  |  | Example 1 | Comp. Example 1 |
|---|---|---|---|
| Shrink (%) at 180° C. | L | 20 | 14 |
|  | T | 22 | 9 |
| Shrink tension (kg/cm²) | L | 38 (158° C.) | 43 (170° C.) |
|  | T | 68 (160° C.) | 15 (175° C.) |

As can be seen from Table 2 although the films of Example 1 and Comp. Example 1 were annealed at the same temperature, the film of Example 1 has a higher shrink than the film of Comp. Example 1 at the same temperature and also a maximum shrink tension at lower temperatures. This combination of shrink properties results in tight-looking packages obtained at the heat-sealing temperature of the film onto a container.

EXAMPLE 2

Several three-layer, heat-shrinkable films with the following layer arrangement B/A/C, wherein A=base layer, B=heat-sealable layer and C=outer layer, were produced using the same temperature and stretching ratios reported above for the film of Example 1. The layer compositions and thicknesses are reported in Table 3. All the films had a shrink of from about 5% to about 10% in each direction at 150° C.

TABLE 3

| Layer B (thickness in μm) | Layer A (thickness in μm) | Layer C (thickness in μm) |
|---|---|---|
| PETG1 (5) | PET1 (15) | 95% PET1 + 5% PETG2 (5) |
| PETG1 (2.5) | PET1 (17.5) | 95% PET1 + 5% PETG2 (5) |
| 80% PETG1 + 20% EAA (2.5) | PET1 (17.5) | 95% PET1 + 5% PETG2 (5) |
| 85% PETG1 + 15% EAA (6) | PET1 (24) | 98% PET1 + 2% PETG2 (5) |
| 85% PETG1 + 15% EAA (6) | 50% PET1 + 50% PETG1 (24) | 98% PET1 + 2% PETG2 (5) |
| 85% PETG1 + 15% EPC (3) | PET1 (27) | 98% PET1 + 2% PETG2 (5) |
| 80% PETG1 + 20% SBS (2.5) | PET1 (17.5) | 95% PET1 + 5% PETG2 (5) |
| 80% PETG1 + 20% PA 6/12 (2.5) | PET1 (17.5) | 95% PET1 + 5% PETG2 (5) |
| 80% PETG1 + 20% ENB (2.5) | PET1 (17.5) | 95% PET1 + 5% PETG2 (5) |
| 75% PET1 + 20% PA 6/12 + 5% PETG2 (5) | PET1 (15) | 95% PET1 + 5% PETG2 (5) |

Wherein: EAA = ethylene/acrylic acid copolymer; SBS = styrene-butadiene block copolymer; PA 6/12 = copolyamide based on ε-caprolactam and laurolactam; ENB = ethylene/norbornene copolymer; EPC = ethylene/propylene copolymer

EXAMPLES 3-6

Several three-layer, heat-shrinkable films with the following layer arrangement B/A/C, wherein A=base layer, B=heat-sealable layer and C=outer layer, were produced using the sequential flat orientation process described in Example 1 with the following stretching conditions:

Longitudinal stretching temperatures: preheating 82° C., stretching 91° C.

Longitudinal stretching ratio: 3.2:1

Transversal stretching temperatures: preheating 100° C., stretching 105° C.

Transversal stretching ratio: 4.5:1

The layer compositions and thicknesses and the annealing temperatures are reported in Table 4.

TABLE 4

|  | Layer B (thickness in μm) | Layer A (thickness in μm) | Layer C (thickness in μm) | Annealing Temperature (° C.) |
|---|---|---|---|---|
| Ex. 3 | PETG1 (6) | PET1 (24) | 98% PET1 + 2% PETG2 (5) | 195 |
| Ex. 4 | PETG1 (6) | 70% PET1 + 30% PETG1 (24) | 98% PET1 + 2% PETG2 (5) | 195 |
| Ex. 5 | PETG1 (6) | 50% PET1 + 50% PETG1 (24) | 98% PET1 + 2% PETG2 (5) | 195 |
| Ex. 6 | PETG1 (6) | 50% PET1 + 50% PETG1 (24) | 98% PET1 + 2% PETG2 (5) | 176 |

The shrink properties of the films of Examples 3 to 6 are reported in Table 5.

TABLE 5

|  |  | Ex. 3 | Ex. 4 | Ex. 5 | Ex. 6 |
|---|---|---|---|---|---|
| Shrink (%) at 120° C. | L | 2 | 2 | 3 | 2 |
|  | T | 3 | 3 | 3 | 2 |
| Shrink (%) at 140° C. | L | 4 | 4 | 4 | 4 |
|  | T | 4 | 5 | 5 | 5 |
| Shrink (%) at 160° C. | L | 7 | 6 | 6 | 7 |
|  | T | 9 | 8 | 8 | 9 |
| Shrink (%) at 180° C. | L | 14 | 13 | 12 | 11 |
|  | T | 14 | 13 | 13 | 14 |
| Shrink tension (kg/cm²) | L | 21.6 (170° C.) | 14.4 (150° C.) | 8.3 (150° C.) | 5.4 (180° C.) |
|  | T | 36.6 (170° C.) | 20.8 (170° C.) | 13.5 (170° C.) | 12.9 (180° C.) |

The addition of 30 and 50% by weight of an amorphous polyester like PETG1 in the base layer of the films of Examples 4 and 5 has a negligible influence on the total amount of shrink of the films with respect to the reference structure of Example 3 but it has an influence on the shrink tension. In fact the maximum shrink tension decreases with increasing amounts of PETG1. Lower values of shrink tension can be an advantage in those packaging applications which require heat-treatment of the package, like pasteurization, as they reduce the risks of distortion of the container.

The invention claimed is:

1. A coextruded, biaxially oriented, heat-shrinkable film comprising a base layer comprising a) at least 50% by weight of a polyester having an intrinsic viscosity greater than 0.75 and b) not more than 50% by weight of an amorphous polyester and an outer heat-sealable layer directly adhered to said base layer, said heat-sealable outer layer comprising an amorphous polyester or a crystalline polyester having a melting temperature not higher than the melting temperature of the polyester of the base layer.

2. The film according to claim 1 wherein the intrinsic viscosity of the polyester of the base layer is at least 0.80.

3. The film according to claim 1 having a shrink in each direction of less than 5% at 100° C. and of at least 5% at 150° C., measured in accordance with ASTM D 2732.

4. The film according to claim 3, wherein the shrink at 150° C. is not more than 30% in each direction.

5. The film according to claim 1 wherein the polyester of the base layer is poly(ethylene terephthalate).

6. The film according to claim 1, wherein the heat-sealable layer comprises a copolyester of terephthalic acid with ethylene glycol and 1,4-cyclohexanedimethanol.

7. The film according to claim 1 comprising a second outer layer directly adhered to the base layer on the opposite side of the heat-sealable layer.

8. The film according to claim 7, wherein the second outer layer comprises the polyester of the base layer.

9. The film according to claim 1 further comprising an anti-fogging agent.

10. The film according to claim 1, wherein the heat-sealable layer further comprises 3 to 40% by weight of a second material selected from polyamides, ethylene/unsaturated carboxylic acid copolymers, ionomers, polystyrenes, ethylene/cyclic olefin copolymers, ethylene/propylene copolymers.

11. A process for the manufacture of a biaxially oriented heat-shrinkable film comprising the steps of coextruding a base layer comprising a) at least 50% by weight of a polyester resin having an intrinsic viscosity greater than 0.75 and b) not more than 50% by weight of an amorphous polyester directly adhered to at least one outer heat-sealable layer, said outer heat-sealable layer comprising an amorphous polyester or a crystalline polyester having a melting temperature not higher than the melting temperature of the polyester of the base layer, quenching the extrudate and biaxially orienting said extrudate at a temperature not exceeding 130° C.

12. The process according to claim 11 which is a flat orientation process.

13. A package comprising a container, a product, and a lid formed of the biaxially oriented heat-shrinkable film of claim sealed onto said container.

* * * * *